(12) United States Patent
Nakayama et al.

(10) Patent No.: US 10,564,321 B2
(45) Date of Patent: Feb. 18, 2020

(54) OPTICAL MEMBER AND METHOD FOR MANUFACTURING OPTICAL MEMBER

(71) Applicant: CANON KABUSHIKI KAISHA, Tokyo (JP)

(72) Inventors: Tomonari Nakayama, Yokohama (JP); Kenji Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 14/962,957

(22) Filed: Dec. 8, 2015

(65) Prior Publication Data

US 2016/0170094 A1 Jun. 16, 2016

(30) Foreign Application Priority Data

Dec. 10, 2014 (JP) ................................. 2014-249675

(51) Int. Cl.
| | | |
|---|---|---|
| *G02B 1/11* | (2015.01) | |
| *G02B 1/111* | (2015.01) | |
| *G02B 1/118* | (2015.01) | |

(52) U.S. Cl.
CPC ..................... *G02B 1/11* (2013.01)

(58) Field of Classification Search
CPC ..... G02B 1/11; G02B 1/111; G02B 2207/107; G02B 1/118
See application file for complete search history.

(56) References Cited

U.S. PATENT DOCUMENTS

| | | | |
|---|---|---|---|
| 5,476,717 A | 12/1995 | Floch | |
| 2002/0105728 A1 | 8/2002 | Yamaguchi | |
| 2009/0041984 A1* | 2/2009 | Mayers ................. | C03C 17/007 428/141 |
| 2009/0274891 A1* | 11/2009 | Sawanobori ........... | G02B 1/111 428/314.4 |
| 2012/0225215 A1 | 9/2012 | Kalyankar | |
| 2013/0004780 A1 | 1/2013 | Hervieu | |
| 2013/0182328 A1* | 7/2013 | Stewart ................. | G02B 1/118 359/580 |
| 2013/0222916 A1* | 8/2013 | Ogane .................... | B82Y 20/00 359/601 |
| 2013/0323464 A1* | 12/2013 | Liang ..................... | C03C 17/42 428/141 |
| 2014/0153099 A1 | 6/2014 | Ogane | |

FOREIGN PATENT DOCUMENTS

| | | |
|---|---|---|
| CN | 101379416 A | 3/2009 |
| CN | 103210045 A | 7/2013 |
| CN | 103328382 A | 9/2013 |
| GB | 2424382 A | 9/2006 |
| JP | H10-090503 A | 4/1998 |
| JP | H11-217558 A | 8/1999 |
| JP | 2000284102 A | 10/2000 |

(Continued)

*Primary Examiner* — Nathan L Van Sell
(74) *Attorney, Agent, or Firm* — Canon U.S.A. Inc., IP Division

(57) ABSTRACT

An optical member including a base material and an antireflection film on the base material, wherein the antireflection film has a porous layer as the surface, the porous layer contains silicon oxide particles and a binder, the porous layer has a refractive index of 1.19 or more and 1.30 or less, and the surfaces of the silicon oxide particles and the binder have alkylsilyl groups.

11 Claims, 2 Drawing Sheets

(56) References Cited

FOREIGN PATENT DOCUMENTS

| | | |
|---|---|---|
| JP | 2004258267 A | 9/2004 |
| JP | 2005-208290 A | 8/2005 |
| JP | 2007-078818 A | 3/2007 |
| JP | 2007-256925 A | 10/2007 |
| JP | 2012-173698 A | 9/2012 |
| JP | 2013-160799 A | 8/2013 |

* cited by examiner

OPTICAL MEMBER AND METHOD FOR MANUFACTURING OPTICAL MEMBER

BACKGROUND OF THE INVENTION

Field of the Invention

The present invention relates to an optical member exhibiting excellent optical characteristics and abrasion resistance and a method for manufacturing the optical member.

Description of the Related Art

Formation of an antireflection film, which has a thickness of several tens to several hundreds of nanometers and which is composed of a single layer or a plurality of layers of optical films stacked having different refractive indices, to suppress reflection at a light incidence and emission interface of an optical device has been known previously. Vacuum film formation methods, e.g., vapor deposition and sputtering, and wet film formation methods, e.g., dip coating and spin coating, are used for forming the antireflection films.

It is known that inorganic materials, e.g., silica, magnesium fluoride, and calcium fluoride, and organic materials, e.g., silicone resins and amorphous fluororesins, which are transparent materials having low refractive indices, are employed as the material used for an outermost layer of the antireflection film.

In recent years, it has been known that a low-refractive-index film through the use of the refractive index of the air of 1.0 is used for the antireflection film in order to further reduce the refractive index. The refractive index can be reduced by forming gaps in the layers of silica and magnesium fluoride. For example, in the case where 30 percent by volume of gaps are disposed in a magnesium fluoride thin film having a refractive index of 1.38, the refractive index can be reduced to 1.27. However, there is an issue that the abrasion resistance of the low-refractive-index layer including gaps is degraded.

Japanese Patent Laid-Open No. 2000-284102 (hereafter referred to as "Patent Literature 1") discloses an antireflection film in which an overcoat layer containing a fluoropolymer is disposed on a low-refractive-index layer in order to improve the abrasion resistance.

Japanese Patent Laid-Open No. 2004-258267 (hereafter referred to as "Patent Literature 2") discloses an antireflection film in which a second binder for improving the abrasion resistance is filled into gaps between hollow fine particles in a low-refractive-index layer in which hollow particles are bonded with a first binder.

However, Patent Literature 1 has an issue that a coating liquid for forming the overcoat layer enters the gaps in the low-refractive-index layer and, thereby, the refractive index of the low-refractive-index layer increases.

Meanwhile, Patent Literature 2 has an issue that the second binder is filled into the gaps between the hollow fine particles and, thereby, the refractive index increases as compared with the refractive index of an antireflection film not filled with the second binder.

SUMMARY OF THE INVENTION

The present invention relates to an optical member including a base material and an antireflection film on the above-described base material, wherein the above-described antireflection film has a porous layer as the surface, the above-described porous layer contains silicon oxide particles and a binder, the above-described porous layer has a refractive index of 1.19 or more and 1.30 or less, and the surfaces of the above-described silicon oxide particles and the above-described binder are alkylsilylated.

Also, the present invention relates to a method for manufacturing an optical member including a base material and an antireflection film having a porous layer as the surface, the method including the steps of forming a porous layer, in which silicon oxide particles are bonded with a binder, on the above-described base material, and surface-treating the above-described porous layer to alkylsilylate the surfaces of the above-described silicon oxide particles and binder by exposure to an atmosphere containing a silazane compound.

Further features of the present invention will become apparent from the following description of exemplary embodiments with reference to the attached drawings.

DESCRIPTION OF THE EMBODIMENTS

The present invention has been made in consideration of the above-described related art and provides an optical member including an antireflection film having the abrasion resistance and a low refractive index and a method for manufacturing the optical member.

The present invention will be described below in detail.

Optical Member

Figure 1:
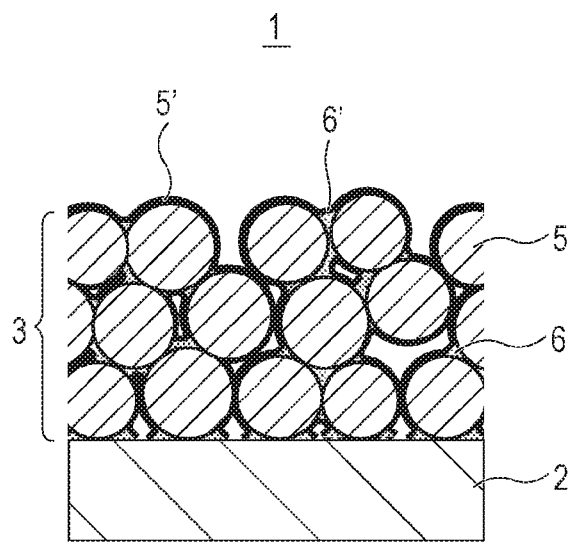
FIG. 1 is a schematic diagram showing an exemplary embodiment of an optical member according to the present invention.

FIG. 1 is a schematic diagram showing an exemplary embodiment of an optical member according to the present invention.

An optical member 1 according to the present invention includes at least a base material 2 and an antireflection film having a porous layer 3 on the base material 2. The porous layer 3 includes silicon oxide particles 5 and a binder 6.

As shown in FIG. 1, in the porous layer 3, the silicon oxide particles 5 are bonded with the binder 6. The surfaces of the silicon oxide particles 5 and the binder 6 have been alkylsilylated and have alkylsilyl groups. That is, an interface 5' between the silicon oxide particle 5 and the air and an interface 6' between the binder 6 and the air are alkylsilylated.

In the porous layer 3, the silicon oxide particles 5 may be in contact with each other or the silicon oxide particles 5 may be bonded to each other with the binder therebetween. From the aspect of an improvement of the abrasion resistance, the silicon oxide particles 5 can be in contact with each other in the porous layer 3.

Figure 2:
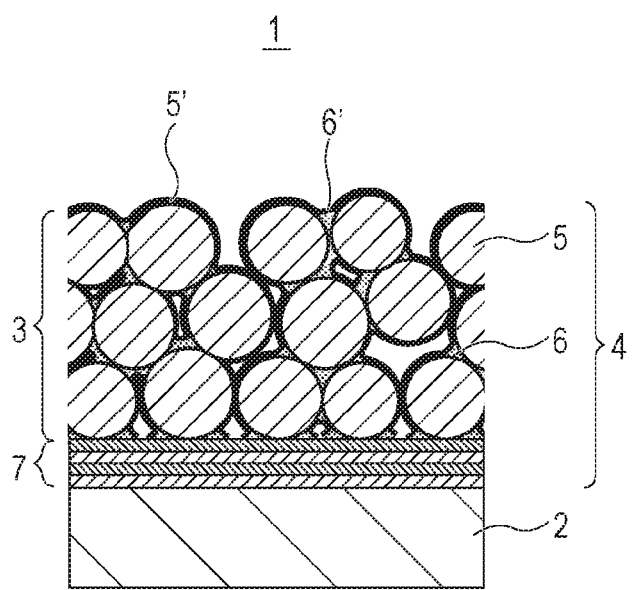
FIG. 2 is a schematic diagram showing an exemplary embodiment of an optical member according to the present invention.

FIG. 2 is a schematic diagram showing another exemplary embodiment of the optical member 1 according to the present invention. In FIG. 2, an oxide layer 7 is included between the base material 2 and the porous layer 3. The porous layer 3 and the oxide layer 7 have the function of the antireflection film 4. The oxide layer 7 can be formed by stacking a high-refractive-index layer and a low-refractive-index layer. As for the high-refractive-index layer, a layer containing zirconium oxide, titanium oxide, tantalum oxide, niobium oxide, or hafnium oxide may be used. As for the low-refractive-index layer, a layer containing silicon oxide or magnesium fluoride may be used.

The optical member according to the present invention may be used for optical lenses, optical mirrors, filters, and optical films. Among them, use for optical lenses can be employed.

Base Material

As for the base material 2, glass, resins, and the like may be used. The shape thereof is not limited, and may be a plane, a curved surface, a concave surface, a convex surface, or a film.

Silicon Oxide Particle

The silicon oxide particles 5 have an average particle size of preferably 10 nm or more and 80 nm or less, and more preferably 12 nm or more and 60 nm or less. In the case where the average particle size of the silicon oxide particles 5 is less than 10 nm, each of gaps between particles and in particles becomes too small and it is difficult to reduce the refractive index. Meanwhile, in the case where the average particle size is more than 80 nm, unfavorably, large voids are tend to be generated because the sizes of gaps between particles increase and scattering associated with the size of the particle occurs.

Here, the average particle size of silicon oxide particles refers to an average Feret diameter. This Feret diameter may be measured by image processing on the basis of observation of a transmission electron microscope image. Commercially available image processing, e.g., image Pro PLUS (produced by Media Cybernetics, Inc.), may be used as the image processing method. In a predetermined image region, if necessary, contrast is adjusted appropriately, an average Feret diameter of each particle is measured by particle measurement, and the average Feret diameter may be calculated by determining the average value.

The silicon oxide particle 5 may take on the shape of any one of complete round, ellipse, disc, rod, needle, chain, and rectangle, and may be a hollow particle having a vacancy in the inside of the particle.

Furthermore, the refractive index can be reduced by increasing the porosity of the porous layer 3 and, therefore, hollow particles or chain particles in the silicon oxide particles 5 are preferably 50 percent by mass or more, and more preferably 80 percent by mass or more.

The hollow particle of silicon oxide is a particle having a vacancy in the inside, where a silicon oxide shell covers the outside of the above-described vacancy. The refractive index of the film can be reduced by the air (refractive index 1.0) contained in the vacancy as compared with the particle having no vacancy. The vacancy may be composed of either a single hole or a plurality of holes and selection may be made appropriately. The thickness of the shell of the hollow particle is preferably 10% or more and 50% or less of the average particle size, and more preferably 20% or more and 35% or less. If the thickness of the shell is less than 10%, the strength of the particle is insufficient unfavorably. Also, if the thickness of the shell is more than 50%, considerable reduction of the refractive index is not exhibited unfavorably.

On the other hand, chain particles are particles, where a plurality of fine particles are linked in the shape of a chain or a string. Even when the film is formed, the linkage in the shape of a chain or a string is maintained, so that the porosity can be increased as compared with the case where a single particle is used. In addition, each particle can be made small and, thereby, voids are not generated easily. The number of fine particles included in fine particles linked into the shape of one chain is 2 or more and 10 or less, preferably 3 or more and 6 or less. If the number of fine particles linked is more than 10, voids are generated easily and the abrasion resistance is degraded.

The silicon oxide particle 5 is a fine particle containing $SiO_2$ as a primary component and Si is preferably 80 atomic percent or more in elements excluding oxygen, and more preferably 90 atomic percent or more. If Si is less than 80 atomic percent, silanol (Si—OH) groups of the fine particle surface to react with the binder 6 are reduced, so that the abrasion resistance is degraded.

As for the silicon oxide particle 5, in addition to $SiO_2$, metal oxides, e.g., $Al_2O_3$, $TiO_2$, $ZnO$, and $ZrO_2$, and organic components, e.g., an alkyl group and a fluoroalkyl group, through a Si atom, may be introduced into the silicon oxide particle or particle surface.

The content of the silicon oxide particles 5 is preferably 50 percent by mass or more and 90 percent by mass or less relative to the porous layer 3, and more preferably 65 percent by mass or more and 85 percent by mass or less.

The surface of the silicon oxide particles 5 are alkylsilylated as with the binder 6 described below.

Binder

The binder 6 may be selected appropriately on the basis of the abrasion resistance, the adhesive force, and the environmental reliability of the film. However, silicon oxide binders can be used because the affinity for the silicon oxide particles 5 is high and the abrasion resistance of the porous film 3 is improved. Among the silicon oxide binders, a silicate hydrolysis condensation product can be used.

The weight average molecular weight of the silicon oxide binder is preferably 500 or more and 3,000 or less in terms of polystyrene. If the weight average molecular weight is less than 500, cracking occurs easily after curing and the stability as a paint is degraded. Meanwhile, if the weight average molecular weight is more than 3,000, the viscosity increases and, thereby, voids in the inside of the binder become nonuniform easily, so that large voids are generated easily.

The content of the binder 6 is preferably 5 percent by mass or more and 40 percent by mass or less relative to the porous layer 3, and more preferably 10 percent by mass or more and 30 percent by mass or less.

The silicon oxide binder can have the composition represented by General formula (1) described below.

(1)

(In General formula (1), R1 represents an alkyl group having the carbon number of 1 to 8, an alkenyl group, an alkynyl group, or an aromatic ring, in which an amino group, an isocyanate group, a mercapto group, an acryloyl group, or a halogen atom may be included as a constituent and 0.90 m 0.99 is satisfied.)

If m is less than 0.9 in General formula (1), the hydrophilicity of the binder 6 is degraded, the interaction between the binder 6 and the silicon oxide particles 5 is weakened, and the abrasion resistance of the porous layer 3 is degraded. In General formula (1), $0.95 \leq m \leq 0.99$ can be further satisfied.

The surface of the binder 6 is alkylsilylated. In the case where the silicon oxide binder is used, a silanol group can be included in the inside of the binder. In the case where the binder 6 includes a silanol group in the inside, the abrasion resistance of the porous layer 3 is improved because of a hydrogen bond.

The alkylsilyl group introduced by alkylsilylation is a substituent represented by —SiR3, =SiR2, or ≡SiR and each R represents a monovalent organic group. As the bulk of the organic group becomes small, organic groups become small steric hindrances to each other and in-plane variations in the water repellency and the refractive index become small, so that alkylsilylation with the alkylsilyl group represented by General formula (2) below can be performed. Also, alkylsilylation with the alkylsilyl group represented by General formula (3) below can be performed because two silanol groups can be bonded and be applied to substitution and, thereby, high water repellency is obtained.

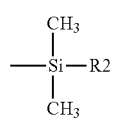

(2)

(In the formula, R2 represents a monovalent organic group which is a straight-chain or branched alkyl group having the carbon number of 1 to 3, an alkenyl group, or a fluoroalkyl group.)

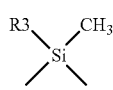

(3)

(In the formula, R3 represents a monovalent organic group which is a straight-chain or branched alkyl group having the carbon number of 1 to 3, an alkenyl group, or a fluoroalkyl group.)

At least two types of alkylsilyl groups may be used in combination.

Porous Layer

The porous layer 3 has a thickness of preferably 80 nm or more and 200 nm or less, and more preferably 100 nm or more and 160 nm or less. If the film thickness is less than 80 nm, the abrasion resistance is not obtained easily and if the film thickness is more than 200 nm, a large extent of scattering occurs easily.

The porosity of the porous layer 3 is preferably 30% or more and 50% or less. If the porosity is less than 30%, the refractive index is high, and in some cases, a high antireflection effect is not obtained. If the porosity is more than 50%, gaps between particles become too large and the abrasion resistance is degraded.

The refractive index of the porous layer 3 is preferably 1.19 or more and 1.30 or less, more preferably 1.22 or more and 1.27 or less, and further preferably 1.22 or more and 1.25 or less.

The porous layer 3 can have a contact angle between the surface of the porous layer 3 and water of 110° or more and 140° or less by being alkylsilylated. If the contact angle is less than 110°, a large amount of silanol group remains at the interface 5' while not being alkylsilylated, so that fine flaws may be generated in wiping with a nonwoven fabric. On the other hand, if the contact angle is more than 140°, residues of those (raw materials and the like used for alkylsilylation) other than the alkylsilyl group may remain at the interface 5', and in some cases, uniform optical characteristics are not obtained in the plane, for example, the refractive index is locally high.

In the porous layer 3, hydrogen of silanol groups remaining at the interfaces to the air, among silanol groups present on the surface of the silicon oxide particles 5 and silanol groups in the silicon oxide binder 6, has been substituted by the alkylsilyl group. The porous layer 3 has high affinity for solvents, e.g., alcohol, and fibers of nonwoven fabrics and, therefore, if silanol groups of these portions remain without being alkylsilylated, traces remain when the surface of the porous layer 3 comes into contact with alcohol and flaws are left after rubbing with a fabric. Meanwhile, the porous layer 3 which has not been alkylsilylated is easily contaminated with, for example, a silicone component vaporized from a coking material used for an inner wall of an apparatus or the like. On the other hand, the porous layer 3 according to the present invention has been alkylsilylated and, therefore, is not contaminated by the silicone component and the like easily.

The porous layer 3 has many gaps, a low refractive index and, at the same time, high water repellency because the surfaces of the silicon oxide particles 5 and the binder 6 have been alkylsilylated. Also, the water repellency of the porous layer 3 is not degraded easily even by external stimuli, e.g., heat and wiping, because the silicon oxide particles 5 and the binder 6 form a strong Si—O—Si bond.

Method for manufacturing optical member

A method for manufacturing the optical member 1 according to the present invention includes the step of forming the porous layer 3, in which the silicon oxide particles 5 are bonded with the binder 6, on the base material 2 or the surface of at least one layer of film formed on the base material 2.

In the step of forming the porous layer 3, either a dry method or a wet method may be used, although the wet method can be used because the porous layer 3 is formed simply.

As for the step of forming the porous layer 3 by the wet method, a method in which a dispersion containing both the silicon oxide particles 5 and the binder 6 is applied or a method in which a dispersion of silicon oxide particles and a binder solution are applied sequentially may be employed. The method in which a dispersion of silicon oxide particles 5 and a solution of binder solution 6 are applied sequentially can be employed because the abrasion resistance of the porous layer 3 can be enhanced.

Figure 3:
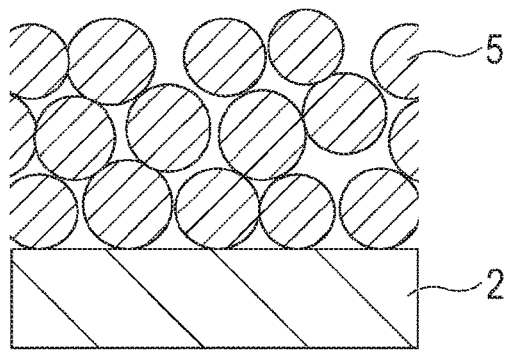
FIG. 3 is a schematic diagram showing an exemplary embodiment of a method for manufacturing an optical member, according to the present invention.
Figure 4:
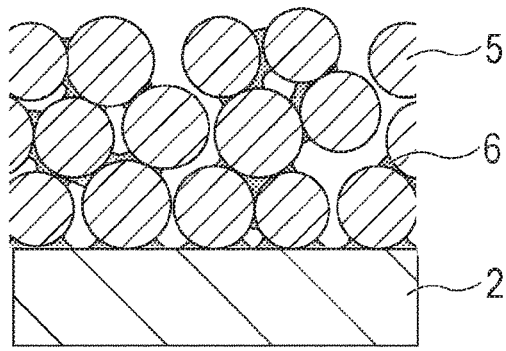
FIG. 4 is a schematic diagram showing an exemplary embodiment of a method for manufacturing an optical member, according to the present invention.

The method in which the dispersion of the silicon oxide particles 5 and the solution of the binder 6 are applied sequentially will be described with reference to the drawings. As shown in FIG. 3, a layer in which the silicon oxide particles 5 are stacked is formed on the base material 2 by applying dispersion of the silicon oxide particles 5. At this time, it is considered that as for the silicon oxide particles 5 in contact with each other, silanol groups of the particle surfaces form a loose bonding state on the basis of a hydrogen bond. Subsequently, the solution of the binder 6 is applied to the layer in which the silicon oxide particles 5 are stacked and, thereby, as shown in FIG. 4, a layer in which the silicon oxide particles 5 are bonded with the binder 6 is formed on the base material 2.

The dispersion of the silicon oxide particles 5 is a liquid in which silicon oxide particles are dispersed in a solvent, and the content of the silicon oxide particles is preferably 2 percent by mass or more and 10 percent by mass or less. A silane coupling agent and a surfactant may be added to the dispersion of the silicon oxide particles 5 to enhance the dispersibility of the silicon oxide particles 5. However, if these compounds react with most of silanol groups of the surface of the silicon oxide particles 5, the bond between the silicon oxide particle 5 and the binder 6 is weakened and the abrasion resistance of the porous layer 3 is degraded. Consequently, additives, e.g., the silane coupling agent and the surfactant, are preferably 10 parts by mass or less relative to 100 parts by mass of silicon oxide particles, and more preferably 5 parts by mass or less.

As for the binder solution, the silicon oxide binder solution can be used because the bonding force between the silicon oxide particle 5 and the binder 6 is large. The silicon oxide binder solution can be prepared by adding water, an acid, or a base to a silicic acid ester, e.g., methyl silicate or ethyl silicate, in a solvent and inducing hydrolysis condensation and contain silicate hydrolysis condensate as a primary component. The acid usable for the reaction is hydrochloric acid, nitric acid, or the like, the base is ammonia or various types of amines, and selection is performed in consideration of the solubility into the solvent and the reactivity of the silicic acid ester. Alternatively, the silicon oxide binder solution may be prepared by neutralizing and condensing a silicate, e.g., sodium silicate, in water and, thereafter, diluting with a solvent. The acid usable for neutralization is hydrochloric acid, nitric acid, or the like.

For the purpose of improving the solubility and coatability, trifunctional silane alkoxides including organic groups as constituents, e.g., methyltriethoxysilane and ethyltriethoxysilane, may be added to the silicon oxide binder. The amount of addition of trifunctional silane alkoxide is preferably 10 percent by mole in the total silane alkoxide. If the amount of addition is more than 10 percent by mole or less, the abrasion resistance is degraded because the organic group hinders a hydrogen bond between silanol groups in the inside of the binder.

The content of silicon oxide in the silicon oxide binder solution is preferably 0.2 percent by mass or more and 2 percent by mass or less.

The solvent usable for the dispersion of the silicon oxide particles 5 and the solution of the silicon oxide binder 6 may be a solvent which dissolve raw materials homogeneously and reaction products are not deposited. Examples thereof include monohydric alcohols, e.g., methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol, polyhydric alcohols, e.g., ethylene glycol and triethylene glycol, ether alcohols, e.g., methoxyethanol, ethoxyethanol, propoxyethanol, isopropoxyethanol, butoxyethanol, 1-methoxy-2-propanol, 1-ethoxy-2-propanol, and 1-propoxy-2-propanol, ethers, e.g., dimethoxyethane, diglyme, tetrahydrofuran, dioxane, diisopropyl ether, and cyclopentyl methyl ether, esters, e.g., ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate, various aliphatic or alicyclic hydrocarbons, e.g., n-hexane, n-octane, cyclohexane, cyclopentane, and cyclooctane, various aromatic hydrocarbons, e.g., toluene, xylene, and ethylbenzene, various ketones, e.g., acetone, methyl ethyl ketone, methyl isobutyl ketone, and cyclohexanone, various chlorinated hydrocarbons, e.g., chloroform, methylene chloride, carbon tetrachloride, and tetrachloroethane, and aprotic polarized solvents, e.g., N-methylpyrrolidone, N,N-dimethylformamide, N,N-dimethylacetamide, and ethylene carbonate. Two types of solvents may be used in combination.

Examples of methods for applying the dispersion of the silicon oxide particles 5 and the solution of the silicon oxide binder 6 include a spin coating method, a blade coating method, a roll coating method, a slit coating method, a printing method, and a dip coating method. In the case where an optical member having a three-dimensionally complicated shape, e.g., a concave surface, is produced, the spin coating method can be employed from the aspect of the uniformity of the film thickness.

After the layer in which the silicon oxide particles 5 are bonded with the binder 6 is formed, drying and/or curing is performed. The drying and the curing are steps to remove the solvent and allow the reaction between the silicon oxide binders or between the silicon oxide binder and the silicon oxide particles to proceed. The temperatures of the drying and the curing are preferably 20° C. or higher or 200° C. or lower, and more preferably 60° C. or higher and 150° C. or lower. If the temperatures of the drying and the curing are lower than 20° C., the solvent remains and the abrasion resistance is degraded. Meanwhile, if the temperatures of the drying and the curing are higher than 200° C., curing of the binder excessively proceeds and cracking occurs in the binder easily. The times of the drying and the curing are preferably 5 minutes or more and 24 hours or less, and more preferably 15 minutes or more and 5 hours or less. If the times of the drying and the curing are less than 5 minutes, the solvent partly remains and in-plane variations of the refractive index may become large, and if the times are more than 24 hours, cracking occurs in the binder easily.

In the case where the dispersion of the silicon oxide particles 5 and the solution of the silicon oxide binder are applied to the base material 2 sequentially, a step of drying and/or baking may be performed after the dispersion of the silicon oxide particles 5 is applied.

Next, the surface treatment step to alkylsilylate the surfaces of the silicon oxide particles 5 and the binder 6 by exposing the porous layer 3 to an atmosphere containing a silazane compound will be described.

The porous layer 3 formed on the base material 2 in the step of forming the porous layer is exposed to the atmosphere containing a silazane compound. At this time, the silazane compound contained in the atmosphere is taken into gaps of the porous layer 3 and comes into contact with the surfaces of the silicon oxide particles 5 and the binder 6. The silazane (Si—N) bond of the silazane compound has high reactivity and, therefore, reacts with silanol (Si—OH) group present on the surfaces of the silicon oxide particles 5 and the binder 6 to form a Si—O—Si bond, so that the porous layer 3 is formed through alkylsilylation.

In contrast to the present invention, as for the method in which dipping into the silazane compound or the silane alkoxide solution is performed, not only the reactivity of the silazane compound is degraded but also it is difficult to perform selective alkylsilylation and maintain the skeleton structure of the silicon oxide particles 5 and the binder 6 because of the effect of swell due to the solvent. In the method of alkylsilylation according to the present invention, the silazane compound does not enter the inside of the silicon oxide particle 5 and the inside of the binder 6.

Figure 5:
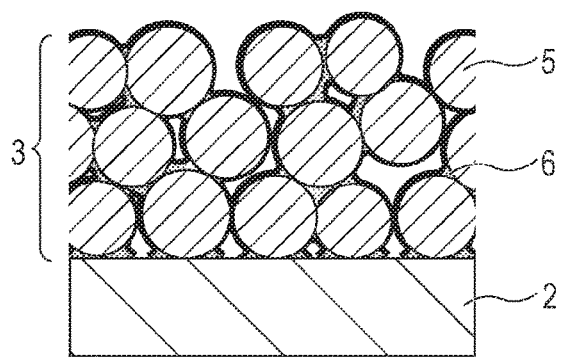
FIG. 5 is a schematic diagram showing an embodiment of a method for manufacturing an optical member, according to the present invention.

Therefore, as shown in FIG. 5, the porous layer 3 in which the surfaces of the silicon oxide particles 5 and the binder 6 has been alkylsilylated while the skeleton of the silicon oxide particles 5 and the binder 6 is maintained is obtained.

Examples of silazane compounds usable for the present invention include (dimethylamino)trimethylsilane, (diethylamino)trimethylsilane, butyldimethyl(dimethylamino)silane, octyldimethyl(dimethylamino)silane, diphenylmethyl(dimethylamino)silane, 1,1,1,3,3,3-hexamethyldisilazane, 1,1,3,3-tetramethyldisilazane, 1,3-divinyl-1,1,3,3-tetramethyldisilazane, 1,3-dipropyl-1,1,3,3-tetramethyldisilazane, 1,3-dibutyl-1,1,3,3-tetramethyldisilazane, 1,3-dioctyl-1,1,3,3-tetramethyldisilazane, 1,3-bis(3,3,3-trifluoropropyl)-1,1,3,3-tetramethyldisilazane, 1,3-diphenyl-1,1,3,3-tetramethyldisilazane, 1,1,3,3-tetraphenyl-1,3-dimethyldisilazane, bis(dimethylamino)dimethylsilane, bis(diethylamino)dimethylsilane, dimethylbis(s-butylamino)silane, phenylmethylbis(dimethylamino)silane, 2,2,4,4,6,6-hexamethylcyclotrisilazane, 2,4,6-trimethyl-2,4,6-trivinylcyclotrisilazane, 2,2,4,4,6,6,8,8-octamethylcyclotetrasilazane, and tris(dimethylamino)methylsilane.

Among the silazane compounds, silazane compounds represented by General formula (4) or (5) below can be used because the reactivity is high and unreacted silazane compounds do not remain easily.

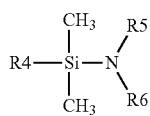

(4)

(In the formula, R4 represents a monovalent organic group which is a straight-chain or branched alkyl group having the carbon number of 1 to 3, an alkenyl group, or a fluoroalkyl group, and R5 and R6 represent independently hydrogen or an alkyl group having the carbon number of 1 to 3.)

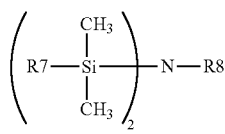

(5)

(In the formula, R7 represents a monovalent organic group which is a straight-chain or branched alkyl group having the carbon number of 1 to 3, an alkenyl group, or a fluoroalkyl group, and R8 represents hydrogen or an alkyl group having the carbon number of 1 to 3.)

Specific examples include (dimethylamino)trimethylsilane, (diethylamino)trimethylsilane, 1,1,1,3,3,3-hexamethyldisilazane, 1,3-divinyl-1,1,3,3-tetramethyldisilazane, 1,3-dipropyl-1,1,3,3-tetramethyldisilazane, and 1,3-bis(3,3,3-trifluoropropyl)-1,1,3,3-tetramethyldisilazane.

Among the silazane compounds, silazane compounds represented by General formula (6) or (7) below can be used because of being bifunctional and a high water-repellent effect.

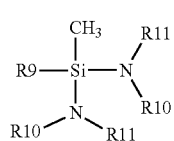

(6)

(In the formula, R9 represents a monovalent organic group which is a straight-chain or branched alkyl group having the carbon number of 1 to 3, an alkenyl group, or a fluoroalkyl group, and R10 and R11 represent independently hydrogen or an alkyl group having the carbon number of 1 to 3.)

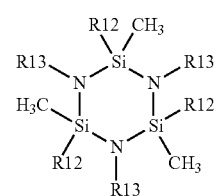

(7)

(In the formula, R12 represents a monovalent organic group which is a straight-chain or branched alkyl group having the carbon number of 1 to 3, an alkenyl group, or a fluoroalkyl group, and R13 represents hydrogen or an alkyl group having the carbon number of 1 to 3.)

Specific examples include bis(dimethylamino)dimethylsilane, bis(diethylamino)dimethylsilane, dimethylbis(s-butylamino)silane, 2,2,4,4,6,6-hexamethylcyclotrisilazane, and 2,4,6-trimethyl-2,4,6-trivinylcyclotrisilazane.

Examples of methods of exposure to an atmosphere containing the silazane compound include a method in which a gas containing the silazane compound is blown on the porous layer 3 and a method in which a gas containing the silazane compound and the porous layer 3 are confined in a container. A method in which a mixed gas containing the silazane compound and the porous layer 3 are confined in a container can be used because the treatment is performed with a small amount of silazane compound. In the case where the treatment is performed in the container, the treatment may be performed under atmospheric pressure or reduced pressure, although the concentration of the silazane compound in the mixed gas is preferably 5 mg/L or more and 200 mg/L or less.

In the case where the porous layer 3 is exposed to the atmosphere containing the silazane compound, the temperature is preferably 10° C. or higher and 60° C. or lower, and more preferably 20° C. or higher and 40° C. or lower. If the temperature of the atmosphere is lower than 10° C., the silazane compound concentration in the atmosphere is too low and, in some cases, a sufficient water-repellent effect is not obtained. If the temperature is higher than 60° C., the porous layer 3 may be swelled with excessive silazane compound.

The time of exposure to the atmosphere containing the silazane compound is preferably 0.5 hours or more and 72 hours or less, and more preferably 3 hours or more and 24 hours or less, although depending on the concentration of the silazane compound in the atmosphere and the temperature. If the exposure time is less than 0.5 hours, alkylsilylation is insufficient and, in some cases, the abrasion resistance is not improved. If the exposure time is more than 72 hours, the silazane compound may react with water and the like and the resulting byproducts may remain in the porous layer 3.

After exposure to the atmosphere containing the silazane compound, a step to remove excess silazane compound in the film may be included. In the case where the volatility of the silazane compound is high, excess silazane compound is emitted into the air by only leaving the porous layer 3 in an atmosphere not containing silazane compound. In the case where the volatility of the silazane compound is low, the silazane compound may be removed by heating or decompression. In the case where heating is performed to remove the silazane compound, heating is performed at preferably 40° C. or higher and 150° C. or lower. Also, excess silazane compound may be washed away with a solvent. At that case, a solvent, e.g., methanol, ethanol, or acetone, having high volatility can be used.

EXAMPLES

The present invention will be specifically described below with reference to the examples. However, the present invention is not limited to the examples below within the gist thereof.
Preparation of Coating Liquid
(1) Preparation of Hollow Sio2 Particle Coating Liquid 1

A hollow $SiO_2$ fine particle coating liquid (solid concentration 3.60 percent by mass) was prepared by diluting 6.00 g of hollow $SiO_2$ particle IPA dispersion (Throughrear 1110 produced by JGC Catalysts and Chemicals Ltd., average particle diameter 55 nm, solid concentration 20.50 percent by mass) with 28.17 g of 1-methoxy-2-propanol.
(2) Preparation of Chain Sio2 Particle Coating Liquid 2

A chain $SiO_2$ fine particle coating liquid (solid concentration 3.00 percent by mass) was prepared by diluting 6.00 g of chain $SiO_2$ particle IPA dispersion (IPA-ST-UP produced by Nissan Chemical Industries, Ltd., average particle diameter 12 nm, solid concentration 15 percent by mass) with 24.00 g of 1-methoxy-2-propanol.
(3) Preparation of SiO2 Binder Coating Liquid 3

A solution of 1.7 g of nitric aqueous solution (concentration 3.7 percent by mass) diluted in advance and 2.30 g of ethanol was added to a solution of 4.17 g of ethyl silicate and 2.30 g of ethanol gradually. After agitation was performed for 15 hours at room temperature, 2.00 g of reaction solution was weighed out and was diluted with 36.33 g of 2-ethyl-1-butanol, so that $SiO_2$ binder coating liquid 3 (solid concentration 0.6 percent by mass) was prepared.
(4) Preparation of Sio2 Binder Coating Liquid 4

A solution of 1.56 g of nitric acid aqueous solution (concentration 3.7 percent by mass) diluted in advance and 2.26 g of ethanol was added to a solution of 3.83 g of ethyl silicate, 0.29 g of methyltriethoxy silane, and 2.26 g of ethanol gradually. After agitation was performed for 15 hours at room temperature, 2.00 g of reaction solution was weighed out and was diluted with 37.66 g of 2-ethyl-1-butanol, so that $SiO_2$ binder coating liquid (solid concentration 0.6 percent by mass), in which 8 percent by mole of methyl group was present as substituent on Si, was prepared.
(5) Preparation of SiO2 Binder Coating Liquid 5

A solution of 1.46 g of nitric acid aqueous solution (concentration 3.7 percent by mass) diluted in advance and 2.23 g of ethanol was added to a solution of 3.63 g of ethyl silicate, 0.46 g of methyltriethoxy silane, and 2.23 g of ethanol gradually. After agitation was performed for 15 hours at room temperature, 2.00 g of reaction solution was weighed out and was diluted with 38.66 g of 2-ethyl-1-butanol, so that $SiO_2$ binder coating liquid (solid concentration 0.6 percent by mass), in which 13 percent by mole of methyl group was present as substituent on Si, was prepared.
Evaluation
(6) Measurement of Film Thickness A spectroscopic ellipsometer (VASE produced by J.A. Woollam Japan) was used, and the wavelength of 380 nm to 800 nm was measured. The film thickness was determined on the basis of analysis.
(7) Measurement of Refractive Index A spectroscopic ellipsometer (VASE produced by J.A. Woollam Japan) was used, and the wavelength of 380 nm to 800 nm was measured. The refractive index was specified to be a refractive index at the wavelength of 550 nm.
(8) Calculation of Porosity The volume ratio of gap portions (including hollow portions of particles) to the entire film was determined from the refractive index at the wavelength of 550 nm and was taken as the porosity. The refractive indices of the particle (excluding hollow portions) and the $SiO_2$ binder were specified to be 1.45, and the refractive index of the gap portion (including hollow portions of particles) was specified to be 1.0.
(9) Evaluation of Abrasion Resistance After a polyester wiper (Alpha Wiper TX1009 produced by Texwipe company) was allowed to reciprocate 20 times while a load of 300 g/cm2 was applied, presence or absence of flaws and scratches was visually observed. Evaluation was performed on the basis of the criteria below.
A: There was no change in the sample.
B: Sample had no flaw but a scratch was observed.
C: Sample was flawed.
(10) Evaluation of Contact Angle A fully automated contact angle meter (DM-701 produced by Kyowa Interface Science Co., Ltd.) was used and a contact angle when a droplet of 2 μl of pure water was allowed to come into contact in an environment at 23° C. and 1 atm was measured. Each of the contact angle just after production and the contact angle after immersion in pure water for 10 minutes was measured three times, and the average value was specified to be the water contact angle. Evaluation was performed on the basis of the criteria below.
A: the case of 110° or more
B: the case of 100° or more and less than 110°
C.: the case of less than 100°
(11) High Temperature High Humidity Test Changes in the refractive index and the pure water contact angle after placement for 72 hours in Environmental Test Chamber (SH-241 produced by ESPEC CORP.) set at 70°/100% RH were examined.
A: the case where the change in the refractive index was less than 0.01 and, therefore, the refractive index hardly changed
B: the case where the change in the refractive index was 0.01 or more
(12) Measurement of Infrared Absorption Spectrum An infrared spectrometer (Spectrum One produced by PerkinElmer, Inc.) and an attached universal ATR with a diamond probe was used and a peak at 3750 cm-1 derived from silanol was observed.

Example 1

In Example 1, a porous layer made from hollow $SiO_2$ fine particles was formed on a base material by dropping an appropriate amount of the hollow $SiO_2$ fine particle coating liquid 1 on a glass base material (nd=1.77, vd=50), which had a diameter (ϕ) of 30 mm and a thickness of 1 mm, and performing spin coating at 3,000 rpm for 20 seconds.

Furthermore, an appropriate amount of the SiO2 binder coating liquid 3 was dropped on the porous layer made from only hollow SiO2 fine particles and spin coating was performed at 4,500 rpm for 20 seconds. Thereafter, a porous layer in which the hollow SiO2 fine particles were bonded with the binder was formed by performing heating in a hot air circulating oven at 140° C. for 30 minutes. Subsequently, 0.1 g of 1,1,1,3,3,3-hexamethyldisilazane serving as a silazane compound was weighed out into a 6 ml glass sample tube and was put into a glass container having a volume of 610 ml together with the above-described base material with the porous layer. The resulting glass container in the state of being sealed with a polypropylene lid provided with a silicon resin packing was stood at 23° C. for 15 hours. Then, the base material with the porous layer was taken out and was stood for 30 minutes in the air. It was ascertained that the entire 1,1,1,3,3,3-hexamethyldisilazane placed in the container was evaporated in 15 hours. The concentration of the silazane compound in the container calculated from the amount of evaporation was 167 mg/L.

As a result, an optical member was produced, wherein a porous layer having a refractive index of 1.24, a porosity of 47%, a film thickness of 124 nm, and a water contact angle of 112° was formed on the base material. The water contact angle after immersion in pure water for 10 minutes was 110° and, therefore, the change was small. No change was observed in the abrasion resistance evaluation and the change in the refractive index in the high temperature high humidity test was small and was less than 0.01. Various evaluation results are collectively shown in Table.

Also, it was ascertained from the IR spectrum that the peak of the silanol group was reduced by half and the surfaces of the hollow SiO2 fine particles and the binder were substituted with the trimethylsilyl group.

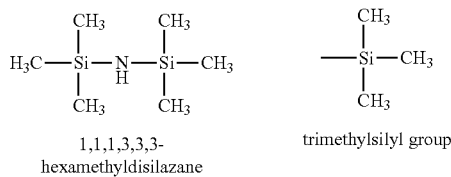

1,1,1,3,3,3-hexamethyldisilazane     trimethylsilyl group

Example 2

In Example 2, a porous layer made from only chain SiO2 fine particles was formed on a base material by dropping an appropriate amount of the chain SiO2 fine particle coating liquid 2 on a glass base material (nd=1.77, vd=50), which had a diameter (φ) of 30 mm and a thickness of 1 mm, and performing spin coating at 3,500 rpm for 20 seconds. Furthermore, an appropriate amount of the SiO2 binder coating liquid 3 was dropped on the porous layer made from only chain SiO2 fine particles and spin coating was performed at 4,500 rpm for 20 seconds. Thereafter, a porous layer in which the chain SiO2 fine particles were bonded with the binder was formed by performing heating in a hot air circulating oven at 140° C. for 30 minutes.

From then on, alkylsilylation was performed by using 1,1,1,3,3,3-hexamethyldisilazane in the same method as in Example 1 to produce an optical member, wherein a porous layer having a refractive index of 1.25, a porosity of 44%, a film thickness of 119 nm, and a pure water contact angle of 114° was formed on the base material. The water contact angle after immersion in pure water for 10 minutes was 112° and, therefore, the change was small. No change was observed in the abrasion resistance evaluation and the change in the refractive index in the high temperature high humidity test was small and was less than 0.01. Also, it was ascertained from the IR spectrum that the peak of the silanol group was reduced by half and the surfaces of the hollow SiO2 fine particles and the binder were substituted with the trimethylsilyl group.

Example 3

In Example 3, an appropriate amount of the SiO2 binder coating liquid 4 was dropped on a porous layer made from only hollow SiO2 fine particles formed on a glass base material, which had a diameter (φ) of 30 mm and a thickness of 1 mm, and spin coating was performed at 4,500 rpm for 20 seconds in the same manner as in Example 1. Thereafter, a porous layer in which the hollow SiO2 fine particles were bonded with the binder was formed by performing heating in a hot air circulating oven at 140° C. for 30 minutes.

From then on, alkylsilylation was performed by using 1,1,1,3,3,3-hexamethyldisilazane in the same method as in Example 1 to produce an optical member, wherein a porous layer having a refractive index of 1.24, a porosity of 47%, a film thickness of 123 nm, and a pure water contact angle of 113° was formed on the base material. The water contact angle after immersion in pure water for 10 minutes was 112° and, therefore, the change was small. No change was observed in the abrasion resistance evaluation and the change in the refractive index in the high temperature high humidity test was small and was less than 0.01. Also, it was ascertained from the IR spectrum that the peak of the silanol group was reduced by half and the surfaces of the hollow SiO2 fine particles and the binder were substituted with the trimethylsilyl group.

Example 4

In Example 4, a porous layer made from only chain SiO2 fine particles was formed on a glass base material (nd=1.77, vd=50), which had a diameter (φ) of 30 mm and a thickness of 1 mm, in the same method as in Example 2. The resulting porous layer was coated with the SiO2 binder coating liquid 4 and heating was performed in the same method as in Example 2, so that a porous layer in which the chain SiO2 fine particles were bonded with the binder was formed.

From then on, alkylsilylation was performed by using 1,1,1,3,3,3-hexamethyldisilazane in the same method as in Example 1 to produce an optical member, wherein a porous layer having a refractive index of 1.25, a porosity of 44%, a film thickness of 119 nm, and a pure water contact angle of 114° was formed on the base material. The water contact angle after immersion in pure water for 10 minutes was 112° and, therefore, the change was small. No change was observed in the abrasion resistance evaluation and the change in the refractive index in the high temperature high humidity test was small and was less than 0.01. Also, it was ascertained from the IR spectrum that the peak of the silanol group was reduced by half and the surfaces of the hollow SiO2 fine particles and the binder were substituted with the trimethylsilyl group.

Example 5

In Example 5, an appropriate amount of the SiO2 binder coating liquid 5 was dropped on a porous layer made from only hollow SiO2 fine particles formed on a glass base material, which had a diameter (φ) of 30 mm and a thickness of 1 mm, and spin coating was performed at 4,500 rpm for 20 seconds in the same manner as in Example 1. Thereafter, a porous layer in which the hollow SiO2 fine particles were bonded with the binder was formed by performing heating in a hot air circulating oven at 140° C. for 30 minutes.

From then on, alkylsilylation was performed by using 1,1,1,3,3,3-hexamethyldisilazane in the same method as in Example 1 to produce an optical member, wherein a porous layer having a refractive index of 1.24, a porosity of 47%, a film thickness of 122 nm, and a pure water contact angle of 113° was formed on the base material. The water contact angle after immersion in pure water for 10 minutes was 112° and, therefore, the change was small. A trace of wiping was slightly observed in the abrasion resistance evaluation. The change in the refractive index in the high temperature high humidity test was small and was less than 0.01. Also, it was ascertained from the IR spectrum that the peak of the silanol group was reduced by half and the surfaces of the hollow SiO2 fine particles and the binder were substituted with the trimethylsilyl group.

Example 6

In Example 6, a porous layer made from only chain SiO2 fine particles was formed on a glass base material (nd=1.77, vd=50), which had a diameter (φ) of 30 mm and a thickness of 1 mm, in the same method as in Example 2. The resulting porous layer was coated with the SiO2 binder coating liquid 4 and heating was performed in the same method as in Example 2, so that a porous layer in which the chain SiO2 fine particles were bonded with the binder was formed.

From then on, alkylsilylation was performed by using 1,1,1,3,3,3-hexamethyldisilazane in the same method as in Example 1 to produce an optical member, wherein a porous layer having a refractive index of 1.24, a porosity of 47%, a film thickness of 118 nm, and a pure water contact angle of 115° was formed on the base material. The water contact angle after immersion in pure water for 10 minutes was 114° and, therefore, the change was small. A trace of wiping was slightly observed in the abrasion resistance evaluation. The change in the refractive index in the high temperature high humidity test was small and was less than 0.01. Also, it was ascertained from the IR spectrum that the peak of the silanol group was reduced by half and the surfaces of the hollow SiO2 fine particles and the binder were substituted with the trimethylsilyl group.

Example 7

In Example 7, a porous layer made from only hollow SiO2 fine particles was formed on a glass base material (nd=1.77, vd=50), which had a diameter (φ) of 30 mm and a thickness of 1 mm, in the same method as in Example 1. The resulting porous layer was coated with the SiO2 binder coating liquid 3 and heating was performed, so that a porous layer in which the hollow SiO2 fine particles were bonded with the binder was formed.

Furthermore, alkylsilylation was performed in the same method as in Example 1 except that the silazane compound was changed to 1,1,3,3-tetramethyldisilazane. It was ascertained that the entire 1,1,3,3-tetramethyldisilazane placed in the container was evaporated in 15 hours.

As a result, an optical member was produced, wherein a porous layer having a refractive index of 1.24, a porosity of 47%, a film thickness of 123 nm, and a pure water contact angle of 126° was formed on the base material. The water contact angle after immersion in pure water for 10 minutes was 109° and, therefore, the change was large although the value was high. No change was observed in the abrasion resistance evaluation and the change in the refractive index in the high temperature high humidity test was less than 0.01. Also, it was ascertained from the IR spectrum that the peak of the silanol group was reduced by half and the surfaces of the hollow SiO2 fine particles and the binder were substituted with the dimethylsilyl group.

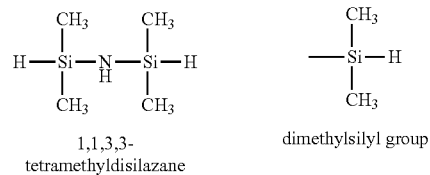

1,1,3,3-tetramethyldisilazane dimethylsilyl group

Example 8

In Example 8, a porous layer made from only chain SiO2 fine particles was formed on a glass base material (nd=1.77, vd=50), which had a diameter (φ) of 30 mm and a thickness of 1 mm, in the same method as in Example 2. The resulting porous layer was coated with the SiO2 binder coating liquid 3 and heating was performed, so that a porous layer in which the chain SiO2 fine particles were bonded with the binder was formed.

Furthermore, alkylsilylation was performed by using 1,1,3,3-tetramethyldisilazane in the same method as in Example 7 to produce an optical member, wherein a porous layer having a refractive index of 1.25, a porosity of 44%, a film thickness of 118 nm, and a pure water contact angle of 127° was formed on the base material. The water contact angle after immersion in pure water for 10 minutes was 108° and, therefore, the change was large although the value was high. No change was observed in the abrasion resistance evaluation and the change in the refractive index in the high temperature high humidity test was less than 0.01. Also, it was ascertained from the IR spectrum that the peak of the silanol group was reduced by half and the surfaces of the hollow SiO2 fine particles and the binder were substituted with the dimethylsilyl group.

Example 9

In Example 9, a porous layer made from only hollow SiO2 fine particles was formed on a glass base material (nd=1.77, vd=50), which had a diameter (φ) of 30 mm and a thickness of 1 mm, in the same method as in Example 1. The resulting porous layer was coated with the SiO2 binder coating liquid 3 and heating was performed, so that a porous layer in which the hollow SiO2 fine particles were bonded with the binder was formed.

Furthermore, alkylsilylation was performed in the same method as in Example 1 except that the silazane compound was changed to 1,3-bis(3,3,3-trifluoropropyl)-1,1,3,3-tetramethyldisilazane. It was examined that the amount of evaporation of 1,3-bis(3,3,3-trifluoropropyl)-1,1,3,3-tetramethyldisilazane placed in the container was 0.004 g in 15 hours. The concentration of the silazane compound in the container calculated from the amount of evaporation was 6.7 mg/L.

As a result, an optical member was produced, wherein a porous layer having a refractive index of 1.25, a porosity of 44%, a film thickness of 122 nm, and a pure water contact angle of 112° was formed on the base material. The water contact angle after immersion in pure water for 10 minutes was 110° and, therefore, the change was small. No change was observed in the abrasion resistance evaluation and the change in the refractive index in the high temperature high humidity test was small and was less than 0.01. Also, it was ascertained from the IR spectrum that the peak of the silanol group was reduced by half and the surfaces of the hollow SiO2 fine particles and the binder were alkylsilylated with 3,3,3-trifluoropropyldimethyl.

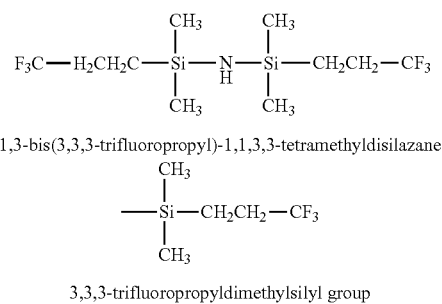

1,3-bis(3,3,3-trifluoropropyl)-1,1,3,3-tetramethyldisilazane 3,3,3-trifluoropropyldimethylsilyl group

Example 10

In Example 10, a porous layer made from only chain SiO2 fine particles was formed on a glass base material (nd=1.77, vd=50), which had a diameter (φ) of 30 mm and a thickness of 1 mm, in the same method as in Example 2. The resulting porous layer was coated with the SiO2 binder coating liquid 3 and heating was performed, so that a porous layer in which the chain SiO2 fine particles were bonded with the binder was formed.

Furthermore, alkylsilylation was performed by using 1,3-bis(3,3,3-trifluoropropyl)-1,1,3,3-tetramethyldisilazane in the same method as in Example 9. Then, an optical member was produced, wherein a porous layer having a refractive index of 1.26, a porosity of 42%, a film thickness of 119 nm, and a pure water contact angle of 112° was formed on the base material. The water contact angle after immersion in pure water for 10 minutes was 110° and, therefore, the change was small. No change was observed in the abrasion resistance evaluation. The change in the refractive index in the high temperature high humidity test was small and was less than 0.01. Also, it was ascertained from the IR spectrum that the peak of the silanol group was reduced by half and the surfaces of the hollow SiO2 fine particles and the binder were substituted with the 3,3,3-trifluoropropyldimethylsilyl group.

Example 11

In Example 11, a porous layer made from only hollow SiO2 fine particles was formed on a glass base material (nd=1.77, vd=50), which had a diameter (φ) of 30 mm and a thickness of 1 mm, in the same method as in Example 1. The resulting porous layer was coated with the SiO2 binder coating liquid 3 and heating was performed, so that a porous layer in which the hollow SiO2 fine particles were bonded with the binder was formed.

Furthermore, alkylsilylation was performed in the same method as in Example 1 except that the silazane compound was changed to dimethylaminotrimethylsilane. It was ascertained that the entire dimethylaminotrimethylsilane placed in the container was evaporated in 15 hours.

As a result, an optical member was produced, wherein a porous layer having a refractive index of 1.24, a porosity of 47%, a film thickness of 123 nm, and a pure water contact angle of 112° was formed on the base material. The water contact angle after immersion in pure water for 10 minutes was 110° and, therefore, the change was small. No change was observed in the abrasion resistance evaluation and the change in the refractive index in the high temperature high humidity test was less than 0.01. Also, it was ascertained from the IR spectrum that the peak of the silanol group was reduced by half and the surfaces of the hollow SiO2 fine particles and the binder were substituted with the trimethylsilyl group.

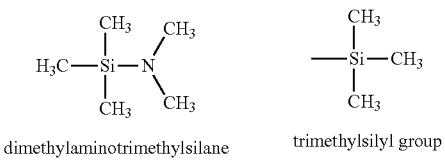

dimethylaminotrimethylsilane        trimethylsilyl group

Example 12

In Example 12, a porous layer made from only chain SiO2 fine particles was formed on a glass base material (nd=1.77, vd=50), which had a diameter (φ) of 30 mm and a thickness of 1 mm, in the same method as in Example 2. The resulting porous layer was coated with the SiO2 binder coating liquid 3 and heating was performed, so that a porous layer in which the chain SiO2 fine particles were bonded with the binder was formed.

Furthermore, alkylsilylation was performed by using dimethylaminotrimethylsilane in the same method as in Example 11 to produce an optical member, wherein a porous layer having a refractive index of 1.25, a porosity of 44%, a film thickness of 118 nm, and a pure water contact angle of 114° was formed on the base material. The water contact angle after immersion in pure water for 10 minutes was 112° and, therefore, the change was small. No change was observed in the abrasion resistance evaluation. The change in the refractive index in the high temperature high humidity test was small and was less than 0.01. Also, it was ascertained from the IR spectrum that the peak of the silanol group was reduced by half and the surfaces of the hollow SiO2 fine particles and the binder were substituted with the trimethylsilyl group.

Example 13

In Example 13, a porous layer made from only hollow SiO2 fine particles was formed on a glass base material (nd=1.77, vd=50), which had a diameter (φ) of 30 mm and a thickness of 1 mm, in the same method as in Example 1. The resulting porous layer was coated with the SiO2 binder coating liquid 3 and heating was performed, so that a porous layer in which the hollow SiO2 fine particles were bonded with the binder was formed.

Furthermore, alkylsilylation was performed in the same method as in Example 1 except that 0.005 g of bis(dimethylamino)dimethylsilane was weighed out as the silazane compound. It was ascertained that the entire bis(dimethylamino)dimethylsilane placed in the container was evaporated in 15 hours. The concentration of the silazane compound in the container calculated from the amount of evaporation was 8.4 mg/L. Excess silazane compound was left on the porous layer and, therefore, washing with ethanol was performed. Thereafter, blower drying was performed with dry air.

As a result, an optical member was produced, wherein a porous layer having a refractive index of 1.27, a porosity of 40%, a film thickness of 122 nm, and a pure water contact angle of 122° was formed on the base material. The water contact angle after immersion in pure water for 10 minutes was 121° and, therefore, the change was small. No change was observed in the abrasion resistance evaluation and the change in the refractive index in the high temperature high humidity test was less than 0.01. Also, it was ascertained from the IR spectrum that the peak of the silanol group was reduced by half and the surfaces of the hollow $SiO_2$ fine particles and the binder were substituted with the dimethylsilylene group.

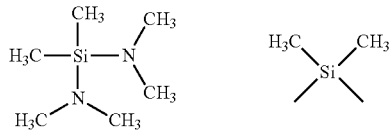

bis (dimethylamino) dimethylsilane   dimethylsilylene group

Example 14

In Example 14, a porous layer made from only chain $SiO_2$ fine particles was formed on a glass base material (nd=1.77, vd=50), which had a diameter (φ) of 30 mm and a thickness of 1 mm, in the same method as in Example 2. The resulting porous layer was coated with the $SiO_2$ binder coating liquid 3 and heating was performed, so that a porous layer in which the chain $SiO_2$ fine particles were bonded with the binder was formed.

Furthermore, alkylsilylation was performed by using bis (dimethylamino)dimethylsilane in the same method as in Example 13 to produce an optical member, wherein a porous layer having a refractive index of 1.28, a porosity of 38%, a film thickness of 117 nm, and a water contact angle of 123° was formed on the base material. The water contact angle after immersion in pure water for 10 minutes was 122° and, therefore, the change was small. No change was observed in the abrasion resistance evaluation. The change in the refractive index in the high temperature high humidity test was small and was less than 0.01. Also, it was ascertained from the IR spectrum that the peak of the silanol group was reduced by half and the surfaces of the hollow $SiO_2$ fine particles and the binder were substituted with the dimethylsilylene group.

Example 15

In Example 15, a porous layer made from only hollow $SiO_2$ fine particles was formed on a glass base material (nd=1.77, vd=50), which had a diameter (φ) of 30 mm and a thickness of 1 mm, in the same method as in Example 1. The resulting porous layer was coated with the $SiO_2$ binder coating liquid 3 and heating was performed, so that a porous layer in which the hollow $SiO_2$ fine particles were bonded with the binder was formed.

Furthermore, alkylsilylation was performed in the same method as in Example 1 except that 0.005 g of 2,2,4,4,6,6-hexamethylcyclotrisilazane was weighed out as the silazane compound. It was ascertained that the entire 2,2,4,4,6,6-hexamethylcyclotrisilazane placed in the container was evaporated in 15 hours. The concentration of the silazane compound in the container calculated from the amount of evaporation was 8.4 mg/L. Excess silazane compound was left on the porous layer and, therefore, washing with ethanol was performed. Thereafter, blower drying was performed with dry air.

As a result, an optical member was produced, wherein a porous layer having a refractive index of 1.25, a porosity of 44%, a film thickness of 123 nm, and a water contact angle of 122° was formed on the base material. The water contact angle after immersion in pure water for 10 minutes was 121° and, therefore, the change was small. No change was observed in the abrasion resistance evaluation and the change in the refractive index in the high temperature high humidity test was less than 0.01. Also, it was ascertained from the IR spectrum that the peak of the silanol group was reduced by half and the surfaces of the hollow $SiO_2$ fine particles and the binder were substituted with the dimethylsilylene group.

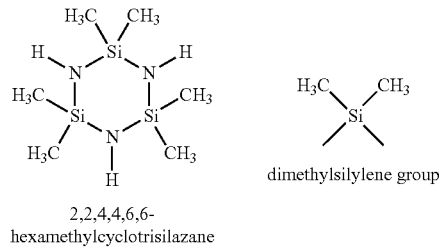

2,2,4,4,6,6-hexamethylcyclotrisilazane     dimethylsilylene group

Example 16

In Example 16, a porous layer made from only chain $SiO_2$ fine particles was formed on a glass base material (nd=1.77, vd=50), which had a diameter (φ) of 30 mm and a thickness of 1 mm, in the same method as in Example 2. The resulting porous layer was coated with the $SiO_2$ binder coating liquid 3 and heating was performed, so that a porous layer in which the chain $SiO_2$ fine particles were bonded with the binder was formed.

Furthermore, alkylsilylation was performed by using 2,2,4,4,6,6-hexamethylcyclotrisilazane in the same method as in Example 15 to produce an optical member, wherein a porous layer having a refractive index of 1.26, a porosity of 42%, a film thickness of 118 nm, and a water contact angle of 123° was formed on the base material. The water contact angle after immersion in pure water for 10 minutes was 122° and, therefore, the change was small. No change was observed in the abrasion resistance evaluation. The change in the refractive index in the high temperature high humidity test was small and was less than 0.01. Also, it was ascertained from the IR spectrum that the peak of the silanol group was reduced by half and the surfaces of the hollow $SiO_2$ fine particles and the binder were substituted with the dimethylsilylene group.

Comparative Example 1

In Comparative example 1, a porous layer made from only hollow $SiO_2$ fine particles was formed on a glass base material (nd=1.77, vd=50), which had a diameter (ϕ) of 30 mm and a thickness of 1 mm, in the same method as in Example 1. The resulting porous layer was coated with the SiO2 binder coating liquid 3 and heating was performed, so that a porous layer in which the hollow SiO2 fine particles were bonded with the binder was formed.

Alkylsilylation was not performed and an optical member was produced, wherein a porous layer having a refractive index of 1.23, a porosity of 49%, a film thickness of 124 nm, and a water contact angle of 8° was formed on the base material. The water contact angle after immersion in pure water for 10 minutes was less than 5° and, therefore, was further reduced. In the abrasion resistance evaluation, flaws were slightly observed. The change in the refractive index in the high temperature high humidity test was large and was more than 0.01. Adsorption of moisture and a very small amount of organic component in the test layer was observed.

Comparative Example 2

In Comparative example 2, a porous layer made from only chain SiO2 fine particles was formed on a glass base material (nd=1.77, vd=50), which had a diameter (ϕ) of 30 mm and a thickness of 1 mm, in the same method as in Example 2. The resulting porous layer was coated with the SiO2 binder coating liquid 3 and heating was performed, so that a porous layer in which the chain SiO2 fine particles were bonded with the binder was formed.

Alkylsilylation was not performed and an optical member was produced, wherein a porous layer having a refractive index of 1.24, a porosity of 47%, a film thickness of 118 nm, and a water contact angle of 7° was formed on the base material. The water contact angle after immersion in pure water for 10 minutes was less than 5° and, therefore, was further reduced. In the abrasion resistance evaluation, flaws were slightly observed. The change in the refractive index in the high temperature high humidity test was large and was 0.02. Adsorption of moisture and a very small amount of organic component in the test layer was observed.

Comparative Example 3

In Comparative example 3, a porous layer made from only hollow SiO2 fine particles was formed on a glass base material (nd=1.77, vd=50), which had a diameter (ϕ) of 30 mm and a thickness of 1 mm, in the same method as in Example 3. The resulting porous layer was coated with the SiO2 binder coating liquid 4 and heating was performed, so that a porous layer in which the hollow SiO2 fine particles were bonded with the binder was formed.

Alkylsilylation was not performed and an optical member was produced, wherein a porous layer having a refractive index of 1.23, a porosity of 49%, a film thickness of 123 nm, and a water contact angle of 20° was formed on the base material. The water contact angle after immersion in pure water for 10 minutes was 15° and, therefore, was further reduced. In the abrasion resistance evaluation, flaws were observed. The change in the refractive index in the high temperature high humidity test was large and was more than 0.01. Adsorption of moisture and a very small amount of organic component in the test layer was observed.

Comparative Example 4

In Comparative example 4, a porous layer made from only chain SiO2 fine particles was formed on a glass base material (nd=1.77, vd=50), which had a diameter (ϕ) of 30 mm and a thickness of 1 mm, in the same method as in Example 4. The resulting porous layer was coated with the SiO2 binder coating liquid 4 and heating was performed, so that a porous layer in which the chain SiO2 fine particles were bonded with the binder was formed.

Alkylsilylation was not performed and an optical member was produced, wherein a porous layer having a refractive index of 1.24, a porosity of 47%, a film thickness of 119 nm, and a water contact angle of 15° was formed on the base material. The water contact angle after immersion in pure water for 10 minutes was 11° and, therefore, was further reduced. In the abrasion resistance evaluation, flaws were observed. The change in the refractive index in the high temperature high humidity test was large and was more than 0.01. Adsorption of moisture and a very small amount of organic component in the test layer was observed.

Comparative Example 5

In Comparative example 5, a porous layer made from only hollow SiO2 fine particles was formed on a glass base material (nd=1.77, vd=50), which had a diameter (ϕ) of 30 mm and a thickness of 1 mm, in the same method as in Example 1.

Subsequently, alkylsilylation was performed by using 1,1,1,3,3,3-hexamethyldisilazane in the same method as in Example 1 to produce an optical member, wherein a porous layer having a refractive index of 1.20, a porosity of 56%, a film thickness of 124 nm, and a water contact angle of 112° was formed on the base material. The water contact angle after immersion in pure water for 10 minutes was 111° and, therefore, the change was small. In the abrasion resistance evaluation, the film was peeled completely. The change in the refractive index in the high temperature high humidity test was small and was less than 0.01. Meanwhile, it was ascertained from the IR spectrum that the peak of the silanol group disappeared and, therefore, the surfaces of the hollow SiO2 fine particles were alkylsilylated because there was no binder.

Comparative Example 6

In Comparative example 6, a porous layer made from only chain SiO2 fine particles was formed on a glass base material (nd=1.77, vd=50), which had a diameter (ϕ) of 30 mm and a thickness of 1 mm, in the same method as in Example 2.

Subsequently, alkylsilylation was performed by using 1,1,1,3,3,3-hexamethyldisilazane in the same method as in Example 1 to produce an optical member, wherein a porous layer having a refractive index of 1.21, a porosity of 53%, a film thickness of 119 nm, and a water contact angle of 113° was formed on the base material. The water contact angle after immersion in pure water for 10 minutes was 111° and, therefore, the change was small. In the abrasion resistance evaluation, the film was peeled completely. The change in the refractive index in the high temperature high humidity test was small and was less than 0.01. Meanwhile, it was ascertained from the IR spectrum that the peak of the silanol group disappeared and, therefore, the surfaces of the hollow SiO2 fine particles were alkylsilylated because there was no binder.

TABLE

| | Material | | | Refractive index | film thickness nm | Porosity % | Water contact angle degree | | Abrasion resistance | Change in refractive index in high temperature high humidity test |
|---|---|---|---|---|---|---|---|---|---|---|
| | Silicon oxide fine particle | Silicon oxide binder | Silazane compound | | | | After production | After immersion in pure water | | |
| Example 1 | Hollow fine particle 1 | 3 | 1,1,1,3,3,3-hexamethyl-disilazane | 1.24 | 124 | 47 | A 112 | A 110 | A | A <0.01 |
| Example 2 | Chain fine particle 2 | 3 | 1,1,1,3,3,3-hexamethyl-disilazane | 1.25 | 119 | 44 | A 114 | A 112 | A | A <0.01 |
| Example 3 | Hollow fine particle 1 | 4 | 1,1,1,3,3,3-hexamethyl-disilazane | 1.24 | 123 | 47 | A 113 | A 112 | A | A <0.01 |
| Example 4 | Chain fine particle 2 | 4 | 1,1,1,3,3,3-hexamethyl-disilazane | 1.25 | 119 | 44 | A 114 | A 112 | A | A <0.01 |
| Example 5 | Hollow fine particle 1 | 5 | 1,1,1,3,3,3-hexamethyl-disilazane | 1.24 | 122 | 47 | A 113 | A 112 | B | A <0.01 |
| Example 6 | Chain fine particle 2 | 5 | 1,1,1,3,3,3-hexamethyl-disilazane | 1.24 | 118 | 47 | A 115 | A 114 | B | A <0.01 |
| Example 7 | Hollow fine particle 1 | 3 | 1,1,3,3-tetramethyl-disilazane | 1.24 | 123 | 47 | A 126 | A 110 | A | A <0.01 |
| Example 8 | Chain fine particle 2 | 3 | 1,1,3,3-tetramethyl-disilazane | 1.25 | 118 | 44 | A 127 | A 110 | A | A <0.01 |
| Example 9 | Hollow fine particle 1 | 3 | 1,3-bis(3,3,3-trifluoropropyl)-1,1,3,3-tetramethyl-disilazane | 1.25 | 122 | 44 | A 112 | A 110 | A | A <0.01 |
| Example 10 | Chain fine particle 2 | 3 | 1,3-bis(3,3,3-trifluoropropyl)-1,1,3,3-tetramethyl-disilazane | 1.26 | 119 | 42 | A 112 | A 110 | A | A <0.01 |
| Example 11 | Hollow fine particle 1 | 3 | dimethylamino-trimethylsilane | 1.24 | 123 | 47 | A 112 | A 110 | A | A <0.01 |
| Example 12 | Chain fine particle 2 | 3 | dimethylamino-trimethylsilane | 1.25 | 118 | 44 | A 114 | A 112 | A | A <0.01 |
| Example 13 | Hollow fine particle 1 | 3 | bis(dimethylamino)dimethylsilane | 1.27 | 122 | 40 | A 122 | A 121 | A | A <0.01 |
| Example 14 | Chain fine particle 2 | 3 | bis(dimethylamino)dimethylsilane | 1.28 | 117 | 38 | A 123 | A 122 | A | A <0.01 |
| Example 15 | Hollow fine particle 1 | 3 | 2,2,4,4,6,6-hexamethylcyclo-trisilazane | 1.25 | 123 | 44 | A 122 | A 121 | A | A <0.01 |
| Example 16 | Chain fine particle 2 | 3 | 2,2,4,4,6,6-hexamethylcyclo-trisilazane | 1.26 | 118 | 42 | A 123 | A 122 | A | A <0.01 |
| Comparative example 1 | Hollow fine particle 1 | 3 | — | 1.23 | 124 | 49 | C 8 | C <5 | C | C >0.01 |
| Comparative example 2 | Chain fine particle 2 | 3 | — | 1.24 | 118 | 47 | C 7 | C <5 | C | C 0.02 |
| Comparative example 3 | Hollow fine particle 1 | 4 | — | 1.23 | 123 | 49 | C 20 | C 15 | C | C >0.01 |
| Comparative example 4 | Chain fine particle 2 | 4 | — | 1.24 | 119 | 47 | C 15 | C 11 | C | C >0.01 |
| Comparative example 5 | Hollow fine particle 1 | — | 1,1,1,3,3,3-hexamethyl-disilazane | 1.20 | 124 | 56 | A 112 | A 111 | C | C <0.01 |
| Comparative example 6 | Chain fine particle 2 | — | 1,1,1,3,3,3-hexamethyl-disilazane | 1.21 | 119 | 63 | A 113 | A 111 | C | C <0.01 |

Evaluation of Examples and Comparative Examples

As for each of the optical members according to Examples 1 to 16, the refractive index of the porous layer was low and was 1.24 to 1.25, the contact angle between the surface of the antireflection film (porous layer) and water was 112° to 127° to exhibit the water repellency, and the abrasion resistance was excellent. Also, the optical members according to Examples 1 to 16 exhibited small changes in the refractive indices between before and after the high temperature high humidity test because surfaces of the silicon oxide particles and the binder were alkylsilylated. On the other hand, the optical members of Comparative examples 1 to 4, in which alkylsilylation was not performed, exhibited no water repellency, poor abrasion resistance, and large changes in the refractive indices between before and after the high temperature high humidity test as compared with the optical members of Examples 1 to 16. The optical members of Comparative examples 5 and 6 including no binder exhibited poor abrasion resistance as compared with the optical members according to Examples 1 to 16.

The optical member according to the present invention may be utilized for imaging equipment, e.g., cameras and video cameras, projection equipment, e.g., liquid crystal projectors and optical scanning apparatuses of electrophotographic equipment, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249675, filed Dec. 10, 2014, which is hereby incorporated by reference herein in its entirety.

What is claimed is:

1. An optical member comprising a base material and an antireflection film on the base material,
wherein the antireflection film has a porous layer,
the porous layer contains silicon oxide particles, a binder, and an internal void, a surface formed by the silicon oxide particles and the binder and facing the internal void has alkylsilyl groups represented by formula (2) and/or formula (3):

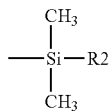
(2)

wherein in the formula (2), R2 represents a monovalent organic group which is a straight-chain or branched alkyl group having the carbon number of 1 to 3, an alkenyl group, or a fluoroalkyl group

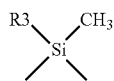
(3)

wherein in the formula (3), R3 represents a monovalent organic group which is a straight-chain or branched alkyl group having the carbon number of 1 to 3, an alkenyl group, or a fluoroalkyl group.

2. The optical member according to claim 1, wherein the porous layer has a porosity of 30% or more and 50% or less.

3. The optical member according to claim 2, wherein the silicon oxide particles have an average particle size of 10 nm or more and 80 nm or less.

4. The optical member according to claim 3, wherein the silicon oxide particles include hollow particles.

5. The optical member according to claim 3, wherein the silicon oxide particles include chain particles.

6. An imaging equipment comprising an optical lens, wherein the optical lens is the optical member according to claim 1.

7. The optical member according to claim 1, wherein the internal void communicates with the porous layer surface.

8. The optical member according to claim 7, wherein the binder is a silicon oxide binder.

9. The optical member according to claim 8, wherein the porous layer has a contact angle between the porous layer surface and water of 110° or more and 140° or less.

10. A projection equipment comprising an optical lens, wherein the optical lens is the optical member according to claim 1.

11. The optical member according to claim 1, wherein the porous layer has a refractive index of 1.22 or more and 1.27 or less.

* * * * *